United States Patent [19]

Glennon

[11] 4,330,743

[45] May 18, 1982

[54] ELECTRICAL AIRCRAFT ENGINE START AND GENERATING SYSTEM

[75] Inventor: Timothy F. Glennon, Rockford, Ill.

[73] Assignee: Sundstrand Corporation, Rockford, Ill.

[21] Appl. No.: 169,699

[22] Filed: Jul. 17, 1980

[51] Int. Cl.³ .................. F02N 11/04; F02N 11/14
[52] U.S. Cl. .......................... 322/10; 290/38 R; 290/46; 318/138; 322/29
[58] Field of Search .................. 322/29, 32, 10–12; 290/32, 36, 38, 52, 46; 363/174, 175, 15; 318/138, 430

[56] References Cited

U.S. PATENT DOCUMENTS

| 3,809,914 | 5/1974 | Kilgore et al. | 322/29 X |
| 3,902,073 | 8/1975 | Lafuze | 290/38 R X |
| 3,908,161 | 9/1975 | Messenger | 322/29 |

Primary Examiner—Robert J. Hickey
Attorney, Agent, or Firm—Ted E. Killingsworth; Michael B. McMurry; Harold A. Williamson

[57] ABSTRACT

This invention relates to electrical aircraft engine start and generating system for use in an aircraft having an engine driven torque converter coupled to an alternator which provides AC power for conversion to DC and AC power. The system includes a reversible AC to DC converter controllably electrically coupled to the alternator and a controller unit to provide DC power in a generating mode. The reversible AC to DC converter is capable of receiving externally supplied DC power to be converted to AC power to drive the alternator as a motor in a start mode. A DC to AC converter is controllably electrically coupled to the controller unit and the DC power output during the generating mode. The reversible DC to AC converter in the start mode is mutually controllably electrically coupled to the externally supplied DC power. The controller unit and the alternator cooperate to provide a controlled AC power output to be delivered to the alternator to bring the alternator operating as a motor up to operating speed, whereupon the reversible DC to AC converter responds to the external DC power and is electrically coupled to the alternator to drive the alternator as a motor to deliver rotary power through the torque converter to start the aircraft engine.

17 Claims, 6 Drawing Figures

ELECTRICAL AIRCRAFT ENGINE START AND GENERATING SYSTEM

TECHNICAL FIELD

This invention relates to an electrical aircraft engine start and generating system for use in aircraft having an engine driven drive unit coupled to an alternator which provides AC power for conversion to DC and AC power.

BACKGROUND ART

Historically, aircraft electrical generating systems have involved electrical generating and distribution systems that provided alternating current at a constant frequency. In fact, most of the aircraft in the world today are provided with constant speed drives that are coupled to generators to furnish constant frequency alternating current to power the numerous AC powered equipment of the aircraft. The engines of some of these aircraft are typically started by the application of pneumatic or AC power to the generator to drive the same as motors during aircraft engine startup.

There has developed a need especially in military aircraft for the generation of DC power for such equipment as radar and avionics. In fact, in this new generation of aircraft, a very high proportion of the power required must be of a DC nature while the need for AC is relatively small.

Typical of the AC type starter-drive systems of the prior art is that shown and described in the U.S. Pat. Nos. to R. W. Reynolds et al 3,274,855 and Aleem 3,786,696. The Reynolds et al and Aleem arrangements each includes a hydraulic unit with a mechanical differential coupled to an aircraft engine and an alternator, which alternator is normally driven by the engine while the aircraft is in operation. The hydraulic unit with the mechanical differential transmits power fpom the engine to the generator to drive the latter at a constant speed regardless of variations in engine speed or load. The alternator is also employed for transmitting power from the generator to the engine when the generator is operated as a motor for purposes of starting the engine. Neither Reynolds et al nor Aleem are capable of providing DC power combined with a DC powered start. The invention to be described hereinafter provides a fresh departure from these typical prior art approaches of Reynolds et al and Aleem.

DISCLOSURE OF INVENTION

More specifically, this invention relates to electrical aircraft engine start and generating system for use in an aircraft having an engine driven torque converter coupled to an alternator which provides AC power for conversion to DC and AC power. The system includes a reversible AC to DC converter controllably electrically coupled to the alternator and a controller unit to provide DC power in a generating mode. The reversible AC to DC converter is capable of receiving externally supplied DC power to be converted to AC power to drive the alternator as a motor in a start mode. A DC to AC converter is controllably electrically coupled to the controller unit and the DC power output during the generating mode. The reversible DC to AC converter in the start mode is mutually controllably electrically coupled to the externally supplied DC power. The controller unit and the alternator cooperate to provide a controlled AC power output to be delivered to the alternator to bring the alternator operating as a motor up to operating speed, whereupon the reversible DC to AC converter responds to the external DC power and is electrically coupled to the alternator to drive the alternator as a motor to deliver rotary power through the torque converter to start the aircraft engine.

It is therefore a principal object of this invention to provide an electrical aircraft engine start and generating system which provides variable frequency AC power for conversion to DC and constant frequency AC power for use in an aircraft having a major requirement for DC power and a minor requirement for AC power.

Another object of the invention is to provide an electrical aircraft engine starting and generating system that includes an engine driven torque converter coupled to an alternator which provides variable frequency AC power for conversion to DC and constant frequency AC power.

Yet another object of the invention is to provide an electrical aircraft engine start and generating system that includes a cooperatively coupled torque converter, an alternator, a reversible AC to DC converter, and a DC to AC converter all of which are controlling coupled to a microprocessor controller unit to thereby furnish DC and AC power for use on an aircraft while additionally providing the concomitant capacity to allow engine start from an externally supplied readily available DC power source. This DC source may be supplied by another engine generating system on the aircraft or from a ground cart.

In the attainment of the foregoing objects this invention contemplates in its preferred embodiment an electrical aircraft engine start and generating system for use in an aircraft having an engine driven torque converter and overrunning clutch arrangement coupled to an alternator which provides AC power for conversion to DC and AC power. The aircraft having a major requirement for DC power and a minor requirement for AC power. The system includes a reversible AC to DC converter controllably electrically coupled to this alternator and a controller unit. The reversible AC to DC converter provides this major DC power output in a generating mode and is capable of receiving from a DC bus externally supplied DC power to be converted to AC power to drive the alternator as a motor in a start mode.

A DC to AC converter is controllably electrically coupled to the controller unit and the DC power output during the generating mode to provide the minor constant frequency AC power requirement. The reversible DC to AC converter in the start mode is mutually controllably, electrically coupled to the externally supplied DC power, the controller unit and the alternator to provide a controlled variable voltage variable frequency AC power output to be delivered to the alternator to bring the alternator, operating as a motor up to operating speed, whereupon the reversible DC to AC converter responds to the external DC power and is electrically coupled to the alternator to drive the alternator as a motor to deliver rotary power through the torque converter to start the engine.

The torque converter is provided with a fill valve which fill valve is controllably coupled to the controller unit to ensure that the torque converter is filled only after the alternator operating as a motor has come up to operating speed and the reversible AC to DC converter is providing AC power to the alternator/motor during the engine start mode.

The torque converter further includes an overrunning clutch which allows a mechanical coupling between the engine and the alternator that bypasses the torque converter during the generating mode.

The system additionally includes an arrangement of remotely controllable electrical contactors. The first of these electrical contactors is located in the electrical coupling between the alternator and the reversible AC to DC converter. The second electrical contactor is positioned in the electrical coupling between the reversible AC to DC converter and the DC bus. A third electrical contactor is situated in the electrical coupling between the DC to AC converter and the DC power output from the AC to DC converter. A fourth electrical contactor finds its place in the electrical coupling between the DC to AC converter and the alternator. The fifth and final electrical contactor is utilized in the electrical coupling between the DC to AC converter and the aircrafts AC loads.

The first through fifth electrical contactors are each separately connected to the controller unit and each is controlled to be opened and closed thereby.

The generating mode of the system is characterized by having the fourth electrical contactor open and the remaining electrical contactors closed in response to contactor close control signals from the controller.

The start mode of the system is characterized by an electrical contactor open and closing sequence in which all contactors are initially open and the externally supplied DC power is provided to the DC bus. Thereafter, the second, third and fourth electrical contactors are closed and the externally provided DC power is delivered to the DC to AC converter, whereupon AC power is delivered to the alternator operated as a motor to bring said alternator/motor up to operating speed, and thereafter the fourth electrical contactor is opened and the first electrical contactor is closed.

The system also includes an alternator rotor position sensor and an engine speed sensor each electrically coupled to the controller unit. The alternator rotor position sensor provides through the controller unit a control of the DC to AC converter as the alternator motor is brought up to operating speed. The engine speed sensor provides through the controller a control to effect the momentary opening and then closing of the first electrical contactor and the closing of the fifth electrical contactor upon engine start and the commencement of the generating mode.

Other objects and advantages of the present invention will be apparent upon reference to the accompanying description when taken in conjunction with the following drawings:

BEST MODE FOR CARRYING OUT THE INVENTION

Figure 1:
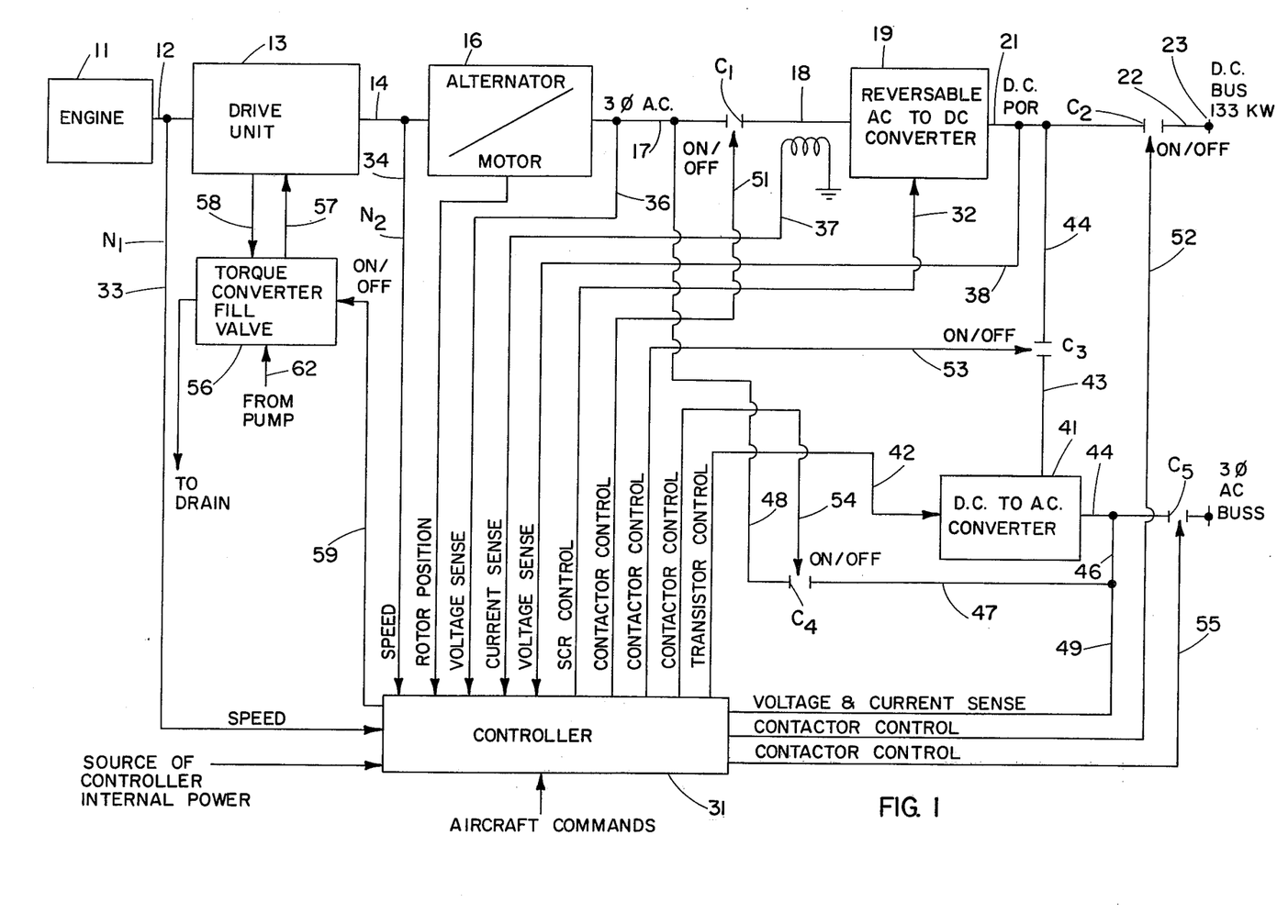
FIG. 1 is a block diagram of the electrical aircraft engine start and generating system embodying the invention.

Reference is now made to FIG. 1 which illustrates in block diagram from the electrical aircraft engine start and generating system embodying the invention. The block diagram of FIG. 1 identifies the key elements of the system. There is shown at the left of FIG. 1 and aircraft engine 11 which provides a variable engine speed delivered through a drive connection 12 to a drive unit 13. The design of unit 13 will be explained in more detail in respect of the description of FIG. 2. The drive unit 13 has a rotary drive connection 14 to an alternator 16. The alternator 16 will provide AC power in a generating mode and this alternator 16 can be driven as a motor in an aircraft engine start mode to be explained more fully hereinafter. The alternator 16 provides three phase AC power on electrical connection 17 to and through an electrical contactor $C_1$ to electrical connection 18 and a reversible AC to DC converter 19. The AC power provided by the reversible AC to DC converter 19 provides DC power on electrical connection 21 through electrical contactor $C_2$ to electrical connection 22 where the DC power is delivered to a DC bus 23 for use by the radar and avionics loads of the aircraft. As has been noted earlier, the aircraft has a major requirement for a DC power output and a minor requirement for AC power. The reversible AC to DC converter 19 is fashioned of a reversible SCR three phase bridge of conventional design. The reversible AC to DC converter 19 is electrically coupled to the alternator 16 by a circuit that includes the electrical connection 18, contactor $C_1$ and electrical connection 17. The reversible AC to DC converter 19 is controllably coupled to a controller 31 via an SCR control connection 32. The reversible AC to DC converter 19 not only provides DC power in a generating mode, but is capable of receiving externally supplied DC power from the DC bus 23 via the circuit that includes electrical connection 22, contactor $C_2$ and electrical connection 21. DC power so delivered to the reversible AC to DC converter provides AC power to the alternator/motor 16 via the circuit that includes electrical connection 18, contactor $C_1$ and electrical connection 17. The alternator/motor 16 can then be driven in the start mode with power delivered from an external source just noted.

A DC to AC converter 41 takes the form of a conventional inverter in the practice of the invention. The DC to AC converter 41 is controllably electrically coupled to the controller 31 via a transistor control connection 42, and to the DC power output from the reversible AC to DC converter 19 via the circuit that includes electrical connection 43, contactor $C_3$, electrical connection 44 and electrical connection 21. The DC to AC converter 41 provides the aforementioned minor AC power requirement delivered to an AC bus 24 for use by AC powered equipment over a circuit that includes electrical connection 44, contactor $C_5$ and connection 24.

In the start mode the DC to AC converter 41 is mutually controllably electrically coupled to the externally supplied DC power via a circuit that includes DC bus 23, electrical connection 22, contactor $C_2$, electrical connection 21, electrical connection 44, contactor $C_3$ and electrical connection 43. The DC to AC converter 41 is controlled by the controller 31 and provides AC power to the alternator/motor 16 delivered over a circuit that includes electrical connection 44, electrical connections 46, 47, contactor $C_4$, electrical connection 48 and electrical connection 17. The AC power so delivered to the alternator/motor 16 causes the alternator/motor 16 to be brought up to operating speed, whereupon the reversible AC to DC converter 19 responds to the externally provided DC power via a circuit that includes DC bus 23, electrical connection 22, contactor $C_2$ and electrical connection 21. The alternator/motor 16 delivers rotary power via the rotary drive connection 14, drive unit 13 and drive connection 12 to the aircraft engine 11 to cause the same to commence the start mode.

The controller 31 is fashioned of a microprocessor and calls for a number of inputs and provides a number of outputs to control the various contactors and major components of the system. Accordingly, the controller 31 is provided with speed sensing inputs taken from either side of the drive unit 13. The speed sensed at these points is respectively delivered over electrical connections 33, 34 to the controller 31. The efficient operation of the reversible AC to DC converter 19 and the DC to AC converter 41 requires amongst other inputs an indication of the alternator/motor 16 rotor position and this input is delivered to the controller via electrical connection 35. The controller 31 is also provided with an indication of the AC voltage on the output from the alternator 16 via a circuit that includes electrical connection 17 and 36. The controller is also provided with an indication of a current present on electrical connection 18 as shown by electrical connection 37. The DC voltage present at the output of the reversible AC to DC converter 19 is delivered to the controller 31 via electrical connection 38 and finally the alternating current and voltage present at the output of DC to AC converter 41 is delivered to the controller 31 via electrical connections 46 and 49. The manner in which the current and voltage sensing just described cooperate with the microprocessor circuitry of the controller 31 will be described more fully hereinafter.

The first electrical contactor $C_1$ is controlled via the electrical connection 51 from the controller 31, while contactors $C_2$, $C_3$, $C_4$, and $C_5$ are respectively electrically controlled via electrical connections 52, 53, 54 and 55.

The generating mode of the system embodying the invention is characterized by having contactor $C_4$ open and contactors $C_1$, $C_2$, $C_3$ and $C_5$ closed in response to contactor close control signals from controller 31 appearing respectively on electrical connections 51, 52, 53 and 55.

The start mode of the system embodying the invention is characterized by an electrical contactor open and closing sequence in which all contactors $C_1$ through $C_5$ are initially open and there is an externally supplied DC power provided to the DC bus 23. The aforementioned sequence is as follows: contactors $C_2$, $C_3$ and $C_4$ are closed and it can be seen that the externally provided DC power will be delivered to the DC to AC converter 41 over a circuit that includes DC bus 23, electrical connection 22, contactor $C_2$, electrical connection 21, electrical connection 44, contactor $C_3$, electrical connection 43, whereupon AC power is delivered to the alternator/motor 16 via a circuit that includes electrical connections 44, 46 and 47, contactor $C_4$, electrical connections 48, 17. The AC power so delivered to the alternator/motor 16 brings the same up to operating speed and thereafter contactor $C_4$ is opened and contactor $C_1$ is closed.

A torque converter fill valve 56 is hydraulically coupled to the drive unit 13 by fill and drain conduits 57, 58. The fill valve 56 is controlled by the controller 31 via an on/off connection 59. The operation of the fill valve 56 will be explained more fully in respect of the description of FIG. 2 set forth in detail hereinafter.

Figure 2:
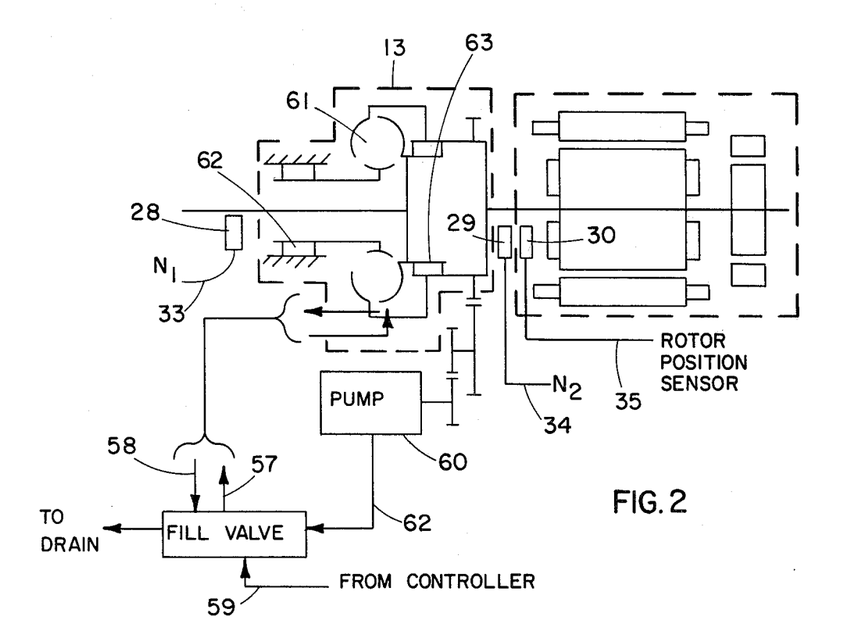
FIG. 2 is a schematic showing of the mechanical arrangement of the drive unit of FIG. 1 which includes a torque converter and overrunning clutch arrangement drivingly connected to an alternator/motor of FIG. 1.

Reference is now made to FIG. 2 which is a schematic showing of the apparatus included in the drive unit 13 of FIG. 1 as well as the alternator/motor 16. The drive unit 13 includes a torque converter 61. A pair of overrunning clutches 62, 63 cooperate with the drive connection 12 to deliver rotary power from the engine 11 (FIG. 1) to the alternator/motor 16 when the system is operating in the generating mode. The overrunning clutch arrangement allows the rotary power from the engine to bypass the torque converter in the generating mode 61. The drive unit with its torque converter and overrunning clutches is conventional in its nature.

The torque converter fill valve 56 noted in the description of FIG. 1 is hydraulically coupled to a pump 60 via conduit 62 and to the torque converter 61 via conduits 57, 58. The fill valve 56 is controllably coupled to the controller 31 via on/off connection 59 to thereby ensure that the torque converter is filled only after the alternator 16 operating as a motor has come up to operating speed and the reversible AC to DC converter 19 is providing variable voltage variable frequency AC power to the alternator/motor 16 during the engine start mode.

A pair of speed sensors 28, 29 positioned as shown provide inputs to the controller 31 via electrical connections 33, 34. The controller 31 is responsive to the sensed speeds and effects a momentary opening and then closing of the electrical contactor $C_1$ and the closing of electrical contactor $C_5$ upon engine start and commencement of the generating mode.

An alternator rotor position sensor 30 is electrically coupled to the controller 31 via electrical connection 35 to provide through the controller 31 over electrical connection 42 a control of the DC to AC converter 41 as the alternator/motor 16 is brought up to operating speed. The details and manner in which the control of the DC to AC converter 41 is accomplished is set forth in FIG. 6.

Figure 3:
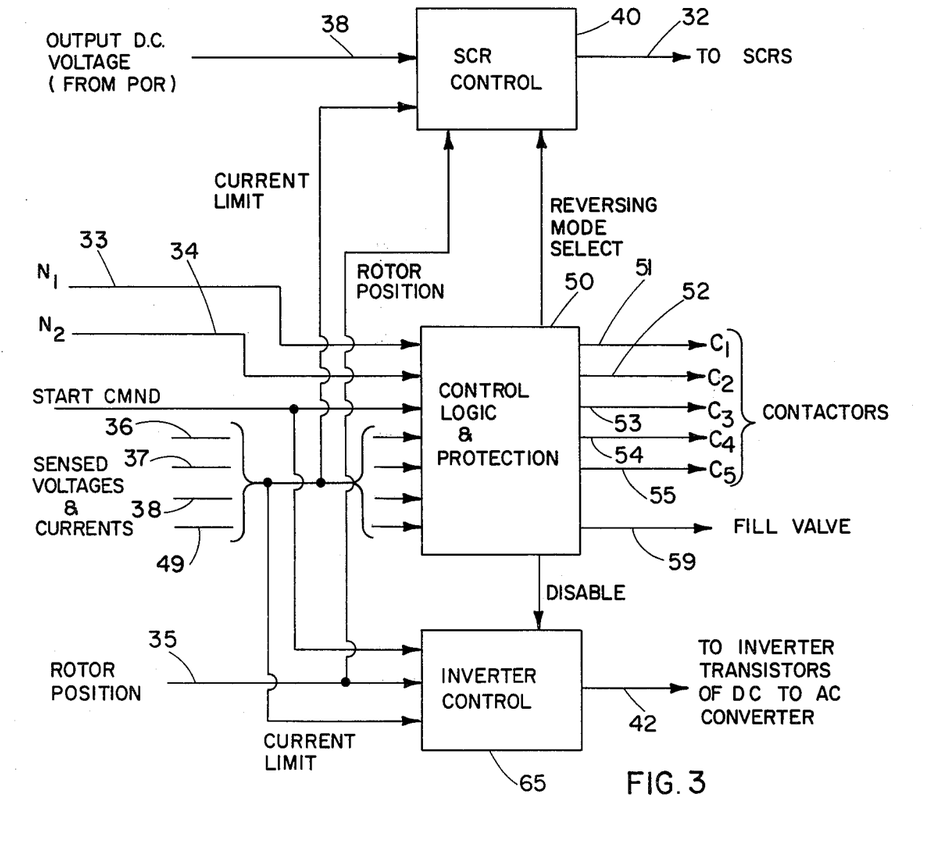
FIG. 3 is a block diagram of the controller of FIG. 1.

Reference is now made to FIG. 3 which depicts in block diagram form the basic components of the controller 31. It should be understood at the outset of the discussion concerning the controller 31 that there are a multitude of approaches to designing the logic of the microprocessor circuitry to accomplish the objects of the invention. Accordingly, the description that follows is to be viewed as merely illustrative of one of many possible approaches. The details of the microprocessor logic do not in themselves form a critical part of the invention. In fact, most of the techniques set forth in the description of FIG. 3 through FIG. 6 are conventional and are well known to those skilled in the art.

The cooperation of the various components shown in FIG. 3 can best be understood if the role and function of the electrical connections explained in respect of FIG. 1 are kept in mind.

The controller has three basic control units which are shown as SCR control 40, control logic and protection 50 and inverter control 65. The control functions of these basic control units can best be appreciated by reference to FIGS. 4, 5 and 6.

Figure 4:
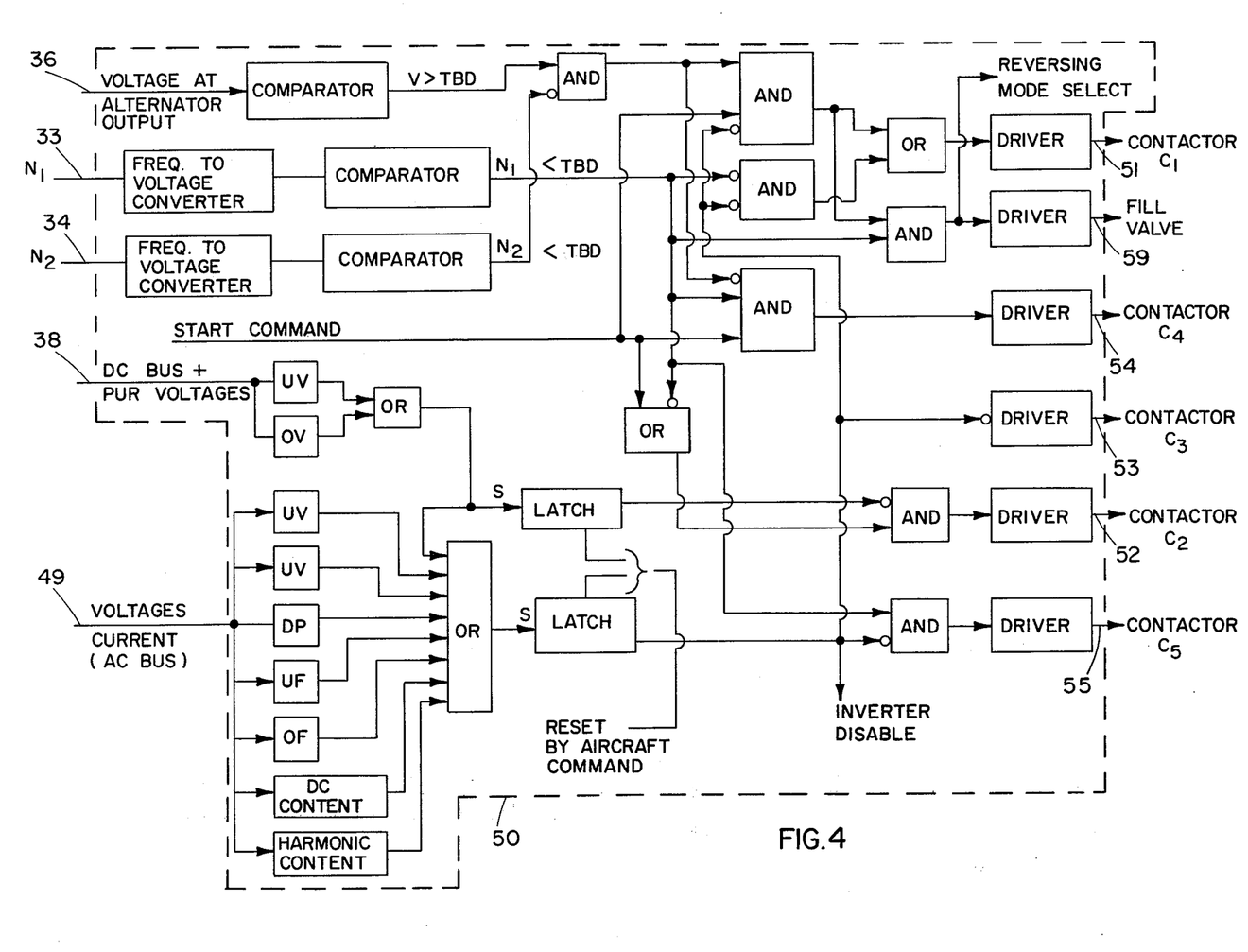
FIG. 4 is a block diagram of the control logic and protection function of FIG. 3.

The diagram of FIG. 4 represents the control logic and protection afforded by control unit 50. In respect of the FIG. 4 illustration it should be noted that all control and logic functions are performed in software.

Figure 5:
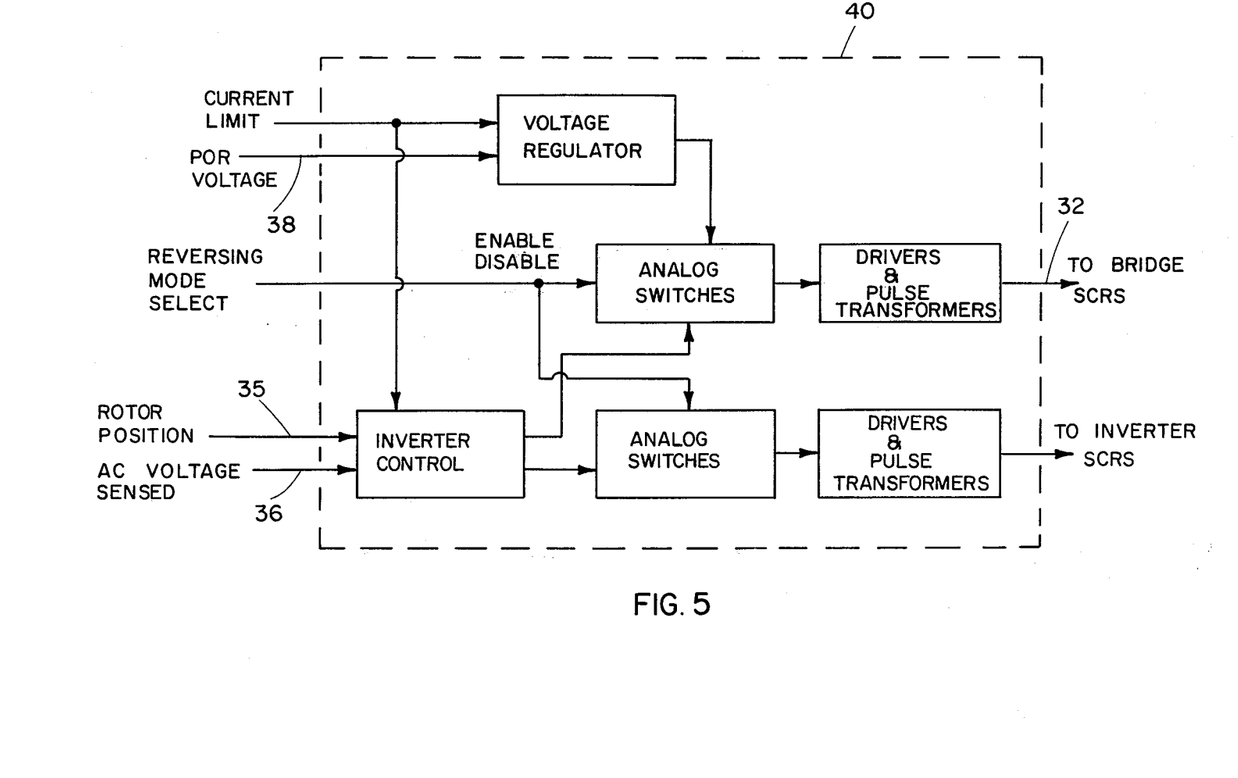
FIG. 5 is a block diagram of the SCR control of FIG. 3.

Reference is now made to FIG. 5 which is a block diagram of the SCR control unit 40 of FIG. 3. When changing from a start mode to a generating mode all SCR's must be turned off momentarily. It should also be noted in respect of FIG. 5 that all control and logic functions are performed in software. As has been noted earlier in the discussion of FIG. 1 and FIG. 2, when the torque converter 61 is empty, the alternator/motor 16 is allowed to spin up unloaded driven by DC to AC converter 41. When the alternator/motor 16 reaches a speed which allows for commutation of the SCR bridge of the reversible AC to DC converter 19, control of the alternator/motor 16 switches from the DC to AC converter 41 to the SCR bridge of the reversible AC to DC converter. The SCR bridge polarity is reversed so that power may flow from the DC bus 23 to the alternator/motor 16 via a circuit that includes electrical connection 22, contactor C₂, connection 21 reversible AC to DC converter 19, connection 18, contactor C₁, connection 17. The operation of the alternator/motor 16 as shown in FIG. 5 is under the control of a current limit AC voltage applied and the rotor position sensor output of connection 35 to thereby time the SCR firing.

Figure 6:
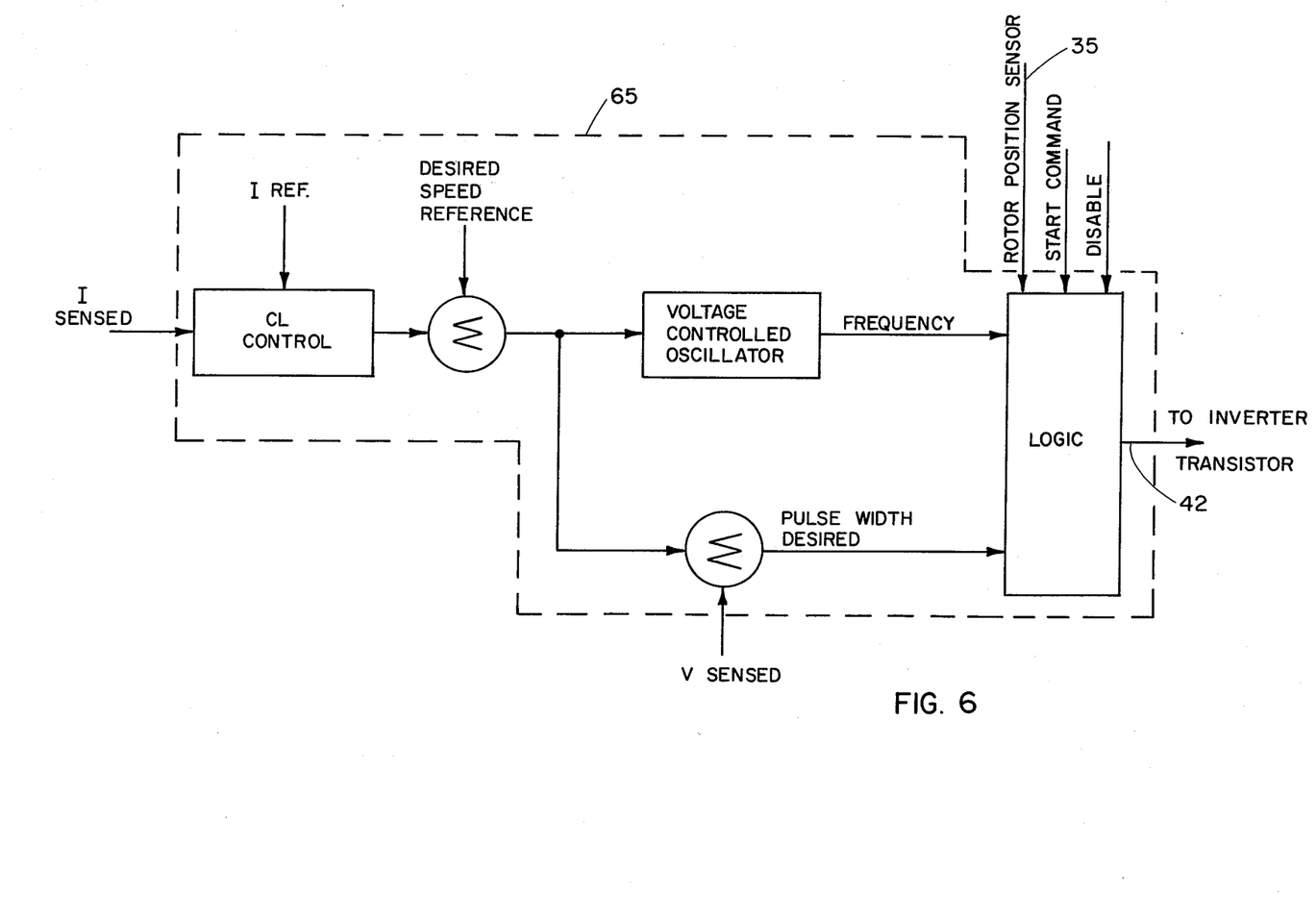
FIG. 6 is a block diagram of this inverter control of FIG. 3.

Referring now to FIG. 6, there is shown in block diagram form the inverter control 65 of FIG. 3. The arrangement of FIG. 6 when operative in the start mode provides a control of the inverter of the DC to AC converter 41 from the controller 31 over electrical connection 42. The DC to AC converter provides a constant volt second per cycle waveform with an appropriate current limit to the alternator/motor 16 via a circuit that includes electrical connections 44, 46, 47, contactor C₄ and electrical connections 48, 17. This variable frequency variable voltage waveform uses an input 35 from the rotor position sensor 30 (FIG. 2) to time the signals. It should also be noted in respect of FIG. 6 that all control and logic functions are to be performed in software.

Although this invention has been illustrated and described in connection with the particular embodiment illustrated, it will be apparent to those skilled in the art that various changes may be made therein without departing from the spirit of the invention as set forth in the appended claims.

I claim:

1. An electrical aircraft engine start and generating system for use in an aircraft having an engine driven drive unit coupled to an alternator which provides AC power for conversion to DC and AC power, said system including in combination:

a reversible AC to DC converter means controllably electrically coupled to said alternator and a controller means to provide DC power output in a generating mode, said reversible AC to DC converter means capable of receiving externally supplied DC power to be converted to AC power to drive said alternator as a motor in a start mode, a DC to AC converter means controllably electrically coupled to said controller means and said DC power output during said generating mode, said DC to AC converter means in said start mode being mutually controllably electrically coupled to said externally supplied DC power, said controller means and said alternator to provide a controlled AC power output to be delivered to said alternator to bring said alternator operating as a motor up to operating speed, whereupon said reversible AC to DC converter responds to said external DC power and is electrically coupled to said alternator to drive said alternator as a motor to deliver rotary power through said drive unit to start said aircraft engine.

2. An electrical aircraft engine start and generating system for use in an aircraft having an engine driven drive unit coupled to an alternator which provides AC power for conversion to DC and AC power, said aircraft having a major requirement for DC power output and a minor requirement for AC power, said system including in combination:

a reversible AC to DC converter means controllably electrically coupled to said alternator and a controller means, said reversible AC to DC converter means providing said major DC power in a generating mode and capable of receiving externally supplied DC power to be converted to AC power to drive said alternator as a motor in a start mode, a DC to AC converter means controllably electrically coupled to said controller means and said DC power output during said generating mode to provide said minor AC power requirement, said DC to AC converter means in said start mode being mutually controllably electrically coupled to said externally supplied DC power, said controller means and said alternator to provide a controlled AC power output to be delivered to said alternator to bring said alternator, operating as a motor up to operating speed, whereupon said reversible AC to DC converter responds to said external DC power and is electrically coupled to said alternator to drive said alternator as a motor to deliver rotary power through said drive unit to start said aircraft engine.

3. The combination of claim 1 wherein said drive unit includes a torque converter.

4. The combination of claim 3 wherein there is included a torque converter fill valve connected to said torque converter and controllably coupled to said controller means to ensure that said torque converter is filled only after said alternator operating as a motor has come up to operating speed and said reversible AC to DC converter is providing AC power to said alternator/motor during said engine start mode.

5. The combination of claim 4 wherein said torque converter includes an overrunning clutch which allows a mechanical coupling between said engine and said alternator that bypasses said torque converter during said generating mode.

6. The combination of claim 2 wherein there is included a DC bus electrically controllably coupled to said reversible AC to DC converter means, and an AC bus electrically controllably coupled to said DC to AC converter means.

7. The combination of claim 6 wherein there is included a first electrical contactor in the electrical coupling between said alternator and said reversible AC to DC converter means, a second electrical contactor in the electrical coupling between said reversible AC to DC converter means and said DC bus, a third electrical contactor in the electrical coupling between said DC to AC converter means and said DC power output from said AC to DC converter means, a fourth electrical contactor in the electrical coupling between said DC to AC converter means and said alternator, a fifth electrical contactor in the electrical coupling between said DC to AC converter means and said AC bus, said first through fifth electrical contactors are separately connected to said controller means and each is controlled to be opened and closed thereby.

8. The combination of claim 7 wherein said generating mode is characterized by having said fourth electrical contactor open and said first, second, third and fifth electrical contactors closed in response to contactor close control signals from said controller means.

9. The combination of claim 8 wherein said start mode is characterized by an electrical contactor open and closing sequence in which all contactors are initially open and said externally supplied DC power is provided to said DC bus, said second, third and fourth electrical contactors are closed and said externally provided DC power is delivered to said DC to AC converter, whereupon AC power is delivered to said alternator operated as a motor to bring said alternator/motor up to operating speed, and thereafter said fourth electrical contactor is opened and said first electrical contactor is closed.

10. The combination of claim 9 which further includes an alternator rotor position sensor electrically coupled to said controller to provide a control of said DC to AC converter by said controller means as said alternator/motor is brought up to operating speed.

11. The combination of claim 10 wherein said drive unit includes a torque converter.

12. The combination of claim 11 wherein there is included a torque converter fill valve connected to said torque converter and controllably coupled to said controller means to ensure that said torque converter is filled only after said alternator operating as a motor has come up to said operating speed and said reversible AC to DC converter is providing AC power to said alternator/motor during said engine start mode.

13. The combination of claim 12 wherein said torque converter includes an overrunning clutch which allows a mechanical coupling between said engine and said alternator that bypasses said torque converter during said generating mode.

14. The combination of claim 13 which further includes an engine speed sensor electrically coupled to said controller means to thereby effect the momentary opening and then closing of said first electrical contactor and the closing of said fifth electrical contactor upon engine start and commencement of said generating mode.

15. The combination of claim 14 wherein said controller means is a microprocessor.

16. The construction of claim 15 wherein said reversible AC to DC converter is an SCR bridge.

17. The combination of claim 16 wherein said DC to AC converter is an inverter.

* * * * *